2,478,098
Patented Nov. 11, 1969

3,478,098
ACIDS AND SALTS OF $B_9H_9CH^-$ AND $B_{11}H_{11}CH^-$ AND PROCESSES FOR PREPARING THEM
Walter H. Knoth, Jr., Mendenhall, Pa., assignor to E. I. du Pont de Nemours and Company, Wilmington, Del., a corporation of Delaware
No Drawing. Filed May 3, 1966, Ser. No. 547,151
Int. Cl. C07f 5/02; C23f 15/00; H01c 13/00
U.S. Cl. 260—567.6          10 Claims

ABSTRACT OF THE DISCLOSURE

When alkali metal salts of $B_{10}H_{12}CH^-$ are heated in an aliphatic ether at a temperature of 200 to 500° C. a mixture containing the anions $B_9H_9CH^-$ and $B_{11}H_{11}CH^-$ is formed. The $B_{11}H_{11}CH^-$ ion can also be formed by the reaction of $B_{10}H_{12}CH^-$ anions with an amine-borane. Salts of $B_9H_9CH^-$ and $B_{11}H_{11}CH^-$ with hydrogen, alkali metal, an equivalent of an alkaline earth metal, ammonium, substituted ammonium and substituted sulfonium cations are described. The acids are useful as rust removers. All of the compounds can be used to prepare resistors.

DESCRIPTION OF THE INVENTION

This invention relates to polyboron compounds and their preparation. More specifically, the invention concerns polyhedral carboranes having a carbon atom in the cage along with nine or eleven boron atoms.

The novel compounds of this invention are polyhedral carboranes of the formula $$M[B_nH_nCH]$$

wherein $n$ is a whole number selected from 9 and 11, $[B_nH_nCH]$ is a novel anion having a valence of $-1$, and M is a cation selected from the class consisting of hydrogen, an alkali metal, one equivalent of an alkaline-earth metal, ammonium, aliphatically saturated hydrocarbyl-substituted ammonium, and tri(aliphatically saturated hydrocarbyl-substituted) sulfonium.

"Aliphatically saturated hydrocarbyl" is defined as a hydrocarbyl group that is free of any aliphatic unsaturation, i.e., the only unsaturation which may be present is aromatic. Thus, the substituents on the ammonium or sulfonium cations can be alkyl, cycloalkyl, aryl, alkaryl, aralkyl, and the like.

The hydrocarbyl substituted ammonium or sulfonium cations can be represented by the formulas $RNH_3^+$, $RR'NH_2^+$, $RR'_2NH^+$, $RR'_3N^+$ and $R_3S^+$ wherein R is aliphatically saturated hydrocarbyl and R' is aliphatically saturated hydrocarbyl bonded to N through an aliphatic carbon atom. Preferably, R and R' each contain 1 through 18 carbon atoms.

Examples of the cations (M) include sodium, potassium, rubidium, barium, calcium, strontium, magnesium, cesium, methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, triisopropylammonium, trihexylammonium, dodecyldimethylammonium, tetraisopentylammonium, heptyltrimethylammonium, trimethylpentylammonium, cyclodecyltrimethylammonium, dimethyloctadecylsulfonium, methyltetramethylenesulfonium, triethylsulfonium, dimethylanilinium, triphenylsulfonium, and the like.

Of the above R and R'-substituted cations, the ammonium cations are preferred because of availability. For the same reason, those containing only lower alkyl (1–8 carbon atoms) are preferred, especially tetramethylammonium and trimethylammonium. The most preferred cations are hydrogen and the alkali metals, especially cesium.

Compounds of the above formula in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. When M is hydrogen, the degree of solvation of the hydrogen ion is of no particular importance to the present invention. The above usage of the term "hydrogen" is based on nomenclature approved by the International Union of Pure and Applied Chemistry; see J. Am. Chem. Soc., 82, 5529–30 (1960).

The novel compounds of this invention can be prepared by heating a compound of the formula $M'B_{10}H_{12}CH$ wherein M' is an alkali metal cation, preferably cesium, at a temperature of between 200° C. and 500° C., and preferably between 250° C. and 400° C. The reactant is converted to the products of this invention, $M'B_9H_9CH$ and $M'B_{11}H_{11}CH$, with hydrogen being evolved. The $B_9$ and $B_{11}$ products can be separated by conventional procedures based on the differences in solubility, e.g., recrystallization from water as described in Example 3.

Pressure is not critical and, for example, pressures of about 0.1 mm. to 20 atmospheres can be employed. Generally, the pressure is between about 0.1 mm. to 1 atmosphere. In addition, the reaction is ordinarily carried out in an inert atmosphere such as nitrogen, argon or helium; but this is not critical. Nor is the time of reaction critical.

Salts of the $B_{10}H_{12}CH^-$ anion reactant used in the above process can also be employed to prepare solely salts of the $B_{11}H_{11}CH^-$ anion of this invention. By reacting a compound of the formula $M''B_{10}H_{12}CH$, wherein M'' is a cation selected from an alkali metal, one equivalent of an alkaline-earth metal, $RR'_3N^+$ or $R_3S^+$, with a tertiary amine-borane of the formula $R''R'''R'^vN \cdot BH_3$, wherein R'', R''' and R'$^v$ are each aliphatically saturated hydrocarbyl groups bonded to the N through aliphatic carbon, the $M''B_{11}H_{11}CH$ salts of this invention are obtained. The carbon content of the tertiary amine-boranes is not critical, but, because of availability, each group is preferably of at most 18 carbon atoms. Thus, classes of tertiary amines from which the amine-borane reactants are derived include trialkylamines, tricycloalkylamines, dialkylmonocycloalkylamines, dialkylmonoaralkylamines, and monoalkyldicycloalkylamines. Preferably, the tertiary amine-borane will be a tri(lower alkyl) amine-borane. M'' in this reaction is preferably cesium or (lower alkyl)$_4$N$^+$ because these salts are insoluble in water and can easily be isolated. The $B_{10}$ reactant is preferably used in its anhydrous form. The reaction is carried out in an inert atmosphere, e.g., nitrogen, helium, argon and the like, at a temperature of between 100–300° C., and preferably between 150–225° C. Pressure and time are not critical; however, times of 2–10 hours are generally employed. The tertiary amine-borane is preferably used in excess amounts since it can also serve as the solvent.

The M''$B_{10}H_{12}CH$ used as the reactant in the above processes is prepared by reacting the compound $$B_{10}H_{12}CNR^v_3$$

wherein each R$^v$ group is of up to 18 carbon atoms and is selected from alkyl, cycloalkyl, or aralkyl, bonded to the nitrogen through carbon bearing at least one hydrogen, with sodium, lithium or potassium in a saturated bis aliphatic ether or diether of up to 8 carbon atoms. Representative ethers include tetrahydrofuran, diethyl ether, dibutyl ether, dioctyl ether, 1,4-dioxane, diethylene glycol diethyl ether, 1,2-dimethoxyethane, and the like. Preferably, $R^v$ in the reactant is lower alkyl. This reaction is carried out at temperatures between 35–150° C., and preferably between 55–100° C. Pressure and reaction time are not critical and will depend upon the temperature and the solvent used. The product is isolated by conventional methods such as precipitation and recrystallization. The $B_{10}H_{12}CNR^v_3$ reactant is prepared as described in copending application Ser. No. 463,336, filed June 11, 1965, in the name of Walter H. Knoth, Jr., by treating $CsB_{10}H_{13}CN$ with dilute HCl or an acid ion-exchange resin, followed by dioxane, and then reacting the resulting precipitate with sodium hydroxide and a hydrocarbylating agent such as a dialkyl sulfate. The $CsB_{10}H_{13}CN$ compound is prepared as described in J. Inorg. Nucl. Chem., 20, 66 (1961).

The salts of $B_9H_9CH^-$ can also be prepared by reacting $B_9H_{11}CNR^v_3$ with sodium, lithium or potassium in a saturated bis aliphatic ether or diether solvent. The reaction conditions are identical with those set forth in the preceding paragraph for the preparation of $MB_{10}H_{12}CH$. The reactant $B_9H_{11}CNR^v_3$ is prepared as described in copending patent application Ser. No. 463,340, filed June 11, 1965, in the name of Walter H. Knoth, Jr., by passing, for example, $CsB_{10}H_{12}CN \cdot S(CH_3)_2$, through an "amberlite" IR 120(H) ion-exchange resin, treating the solution obtained with NaOH and dimethyl sulfate to obtain $B_{10}H_{11}OHCN(CH_3)_3$ and reacting this product with NaOH in tetrahydrofuran to obtain $B_9H_{11}CN(CH_3)_3$. The reactant $CsB_{10}H_{12}CN \cdot S(CH_3)_2$ is prepared as described in J. Inorg. Nucl. Chem. 20, 66 (1961).

Once the salts of this invention have been obtained by the procedures described above, they can be converted to any other salt or acid of the invention by cation-exchange methods. For example, the salts of the invention obtained by the procedures described above will usually be the $Rb^+$, $Cs^+$, $RR'_2NH^+$, $RR'_3N^+$ or $R_3S^+$ salts because they are relatively insoluble in water and are thus most easily obtained. These salts can then be subjected to conventional cation-exchange techniques to obtain other salts or acids of the invention. For example, cation-exchange resins can be prepared containing the desired cation (e.g., hydrogen, sodium, ammonium, and the like), and a solution of the salt whose cation is to be replaced passed through. Alternatively, once the acids of this invention (i.e., where M is hydrogen) are obtained, they can be treated with an equivalent amount of a hydroxide containing the desired replacing cation. When the desired cation is $NH_4^+$, $RNH_3^+$, $RR'NH_2^+$, or $RR''_2NH^+$, then anhydrous ammonia or the appropriate anhydrous amine can be used for the neutralization instead of the hydroxide. The water can then be evaporated leaving the desired salt. In addition, when the base is volatile, an excess can be used and any remaining can be removed by evaporation.

The novel compounds of this invention are salts and acid whose anion has the formula $B_nH_nCH^-$ where $n$ is 9 or 11, i.e., $B_9H_9CH^-$ or $B_{11}H_{11}CH^-$. The cation is present solely to fulfill the valence requirements of the anion, and is otherwise not a critical part of this invention. Each of these novel anions has a cage structure of which the carbon atom of the anion is a part, i.e., the carbon atom can be considered as having replaced one boron atom in a $B_{11}H_{10}^{2-}$ or $B_{12}H_{12}^{2-}$ cage structure. There are several formulation systems for denoting the presence of the carbon atom as a part of the cage structure, e.g., $B_9H_9CH^-$, $B_9H_{10}C^-$, $CB_9H_{10}^-$ or $B_9CH_{10}^-$. The first type has been used herein because it shows that one hydrogen is bonded directly to the carbon atom.

The products and processes of this invention are illustrated in further detail in the following examples:

EXAMPLE 1

Preparation of $CsB_{11}H_{11}CH$

Part A.—A mixture of sodium (7 g. of a 50% dispersion in oil), $B_{10}H_{12}CN(CH_3)_3$ (10 g.) and 200 ml. of tetrahydrofuran was refluxed in a nitrogen atmosphere for 7 hours and then filtered. The filter cake was added to 300 ml. of ethanol to decompose excess sodium. After apparent reaction ceased, the ethanol mixture was filtered and the filtrate, which contained $NaB_{10}H_{12}CH$ in solution, was concentrated in vacuum at room temperature until essentially all of the ethanol had been removed. The residue was diluted with 100 ml. of water and then the mixture was filtered. The addition of excess 50% cesium hydroxide solution to the filtrate precipitated a solid which was recrystallized two times from water to obtain 3 g. of $CsB_{10}H_{12}CH$.

Analysis.—Calcd. for $CsB_{10}H_{12}CH$: B, 40.5; C, 4.5; H, 4.9. Found: B, 41.3; C, 5.1; H, 5.0.

In a similar preparation, the $B_{10}H_{12}CH^-$ anion was precipitated as a trimethylammonium salt which was then recrystallized from water.

Analysis.—Calcd. for $(CH_3)_3NHB_{10}H_{12}CH$: B, 56.0; C, 24.9; H, 11.9; N, 7.2; neut. equiv. 193; appar. mol. wt. 96; H by evolution, 2320 ml./gm. Found: B, 56.1; C, 25.4; H, 12.3; N, 7.2; neut. equiv., 200; appar. mol. wt. 94; H by evolution (platinum-catalyzed hydrolysis), 2358 ml./gm. The apparent molecular weight is the formula weight divided by the number of ions per molecule.

Part B.—A solution of $CsB_{10}H_{12}CH$ (10 g.) in 50 ml. of triethylamine-borane was heated to 160–170° in an open system under a nitrogen atmosphere for two hours. The solution was cooled and diluted with 225 ml. of benzene and 225 ml. of cyclohexane to precipitate 3.3 g. of a cesium salt. Infrared analysis of this salt showed that conversion to $CsB_{11}H_{11}CH$ was not complete. Accordingly, the filtrate from the isolation of this crude product was concentrated under vacuum until a viscous residue was obtained. This was diluted with 40 ml. of triethylamine-borane, the crude product isolated above was recrystallized from water and added to the new triethylamine-borane solution. This was heated to 170–175° for 5 hours. Dilution of the solution with benzene and petroleum ether gave 3.9 g. of $CsB_{11}H_{11}CH$ which was recrystallized from water and then dried at 80° under vacuum for 5 hours.

Analysis.—Calcd. for $CsB_{11}H_{11}CH$: B, 43.0; C, 4.4; H, 4.4; H by evolution, 1710 ml./gm. Found: B, 42.6; C, 4.6; H, 4.5; H by evolution (platinum-catalyzed hydrolysis), 1723 ml./gm.

The 19.2 Mc $B^{11}$ n.m.r. spectrum of $CsB_{11}H_{11}CH$ in acetonitrile consists of three overlapping doublets of approximate intensity ratios 1:5:5. This in consistent with an icosahedral structure for the $B_{11}H_{11}CH^-$ anion with the skeletal icosahedral atoms consisting of 11 borons and one carbon, each of these being terminally bonded to one hydrogen atom.

EXAMPLE 2

Preparation of $(CH_3)_4NB_9H_9CH$ and $CsB_9H_9CH$

Part A.—A mixture of sodium (3 g. of a 50% dispersion in oil), $B_9H_{11}CN(CH_3)_3$ (3.0 g.) and 100 ml. of tetrahydrofuran was refluxed in an atmosphere of nitrogen for 4½ hours. The reaction mixture was filtered and the filtrate was evaporated in a stream of air. The residue was extracted with 125 ml. of water. The extracts were filtered, allowed to stand for three days and then filtered again. The addition of tetramethylammonium chloride to the filtrate, which contained $NaB_9H_9CH$ in solution, precipitated a solid which was recrystallized from water to obtain $(CH_3)_4NB_9H_9CH$.

Analysis.—Calcd. for $(CH_3)_4NB_9H_9CH$: B, 50.4; C, 31.1; H, 11.4; N, 7.2; appar. mol. wt. 96; H by evolution, 1970 ml./gm. Found: B, 50.7; C, 31.4; H, 11.9; N, 7.2; appar. mol. wt. 103; H by evolution (platinum-catalyzed hydrolysis), 2003 ml./gm. The nuclear magnetic resonance (n.m.r.) spectrum confirmed the identification.

*Part B.*—A mixture of sodium (5 g. of a 50% dispersion in oil), $B_9H_{11}CN(CH_3)_3$ (5 g.) and 125 ml. of tetrahydrofuran was refluxed for 5 hours in a nitrogen atmosphere. The mixture was cooled and filtered, the filtrate was evaporated on a steam bath. The residue was extracted with 100 ml. of water and the extract was filtered. After standing overnight, it was filtered again and excess 50% aqueous cesium hydroxide was added to precipitate a solid. Recrystallization from water gave $CsB_9H_9CH$. The structure was confirmed by the n.m.r. and IR spectra.

EXAMPLE 3

Preparation of $CsB_9H_9CH$ and $CsB_{11}H_{11}CH$ $CsB_{10}H_{12}CH$ (3.8 g.) was heated for 5¼ hours at 320–330° and about 1 mm. pressure. The residual solid was recrystallized twice from water to obtain $CsB_9H_9CH$. The mother liquor from the second recrystallization was partially concentrated in three stages. The concentrate was filtered after each stage. The product obtained from the final filtration was shown by infrared analysis to be $CsB_{11}H_{11}CH$.

In a similar experiment, on a smaller scale, gas evolved during the thermolysis was measured and found to amount to 1.05 mole equivalent. This is in agreement with the equation:

$$2CsB_{10}H_{12}CH \rightarrow CsB_{11}H_{11}CH + CsB_9H_9CH + 2H_2$$

The infrared spectrum of the salt obtained in the first part of this example was essentially identical with that obtained in Example 2, Part B.

EXAMPLE 4

Preparation of $CsB_9H_9CH$ and $(CH_3)_3NH[B_9H_9CH]$

*Part A.*—A mixture of $Cs_2B_{10}H_{13}CN$ (30.7 g.) and 12M hydrochloric acid (100 ml.) was stirred until essentially all the solid dissolved. Vigorous bubbling ensued during this period. The solution was filtered and dioxane (50 ml.) was added to the filtrate to precipitate 10 g. of a solid containing $B_{10}H_{12}CNH_3 \cdot$dioxane and $$B_9H_{11}CNH_3 \cdot \text{dioxane}$$

Prolonged heating of part of this mixture at 135° in vacuo resulted in removal of the dioxane. Reaction of this product with aqueous sodium hydroxide and dimethyl sulfate precipitated a solid which was shown by proton magnetic resonance analysis to contain $B_{10}H_{12}CN(CH_3)_3$ and $B_9H_{11}CN(CN_3)_3$.

*Part B.*—This mixture (15.5 g.) and sodium (14 g. of a 50% dispersion in oil) was placed in 400 ml. of tetrahydrofuran which was then refluxed for 16 hours in a nitrogen atmosphere. After the solution was cooled, ethanol (100 ml.) was added slowly. After apparent reaction ceased, the mixture was filtered; the filtrate was evaporated under vacuum to leave a sludge which was mixed with 100 ml. of water. The oil present was separated and the aqueous solution was filtered. The addition of excess 50% cesium hydroxide solution precipitated a solid which was recrystallized from water to obtain 3.5 g. of $CsB_9H_9CH$, identified by infrared, elemental and $B^{11}$ n.m.r. analysis.

*Analysis.*—Calcd. for $CsB_9H_9CH$: C, 4.8; H, 4.0. Found: C, 5.6; H, 4.2.

The 19.2 Mc $B^{11}$ n.m.r. spectrum of $CsB_9H_9CH$ in acetonitrile consists of a doublet at −11.8 p.p.m. (J=152 cps.), relative intensity 0.92; and of overlapping doublets of equal intensity at +37.4 p.p.m. (J=138 cps.) and +43.8 p.p.m. (J=107 cps.), total relative intensity 8.1. The chemical shifts are referred to methyl borate. These data are consistent with the structure of the $B_9H_9CH^-$ anion as an Archimedean antiprism of 8 boron atoms capped at one square face with an additional boron atom and at the other square face with a carbon atom, each of the 10 skeletal atoms being terminally bonded to one hydrogen atom.

In a similar experiment, the crude cesium salt obtained was recrystallized from water. It was then dissolved in water. The addition of trimethylammonium chloride to the solution precipitated $(CH_3)_3NH[B_9H_9CH]$ as shown by infrared analysis.

The reaction mixture in Part B contained $$B_{10}H_{12}CN(CH_3)_3$$

which was converted to $CsB_{10}H_{12}CH$ (see Example 1, Part A). However, isolation of the $B_9H_9CH^-$ salts was not hindered because the $CsB_{10}H_{12}CH$ is relatively more soluble and remains in solution.

EXAMPLE 5

Preparation of $HB_{11}H_{11}CH$

An aqueous solution of $CsB_{11}H_{11}CH$ was passed through an ion exchange column which was packed with a strongly acidic ion exchange resin. The effluent solution was strongly acidic and contained $HB_{11}H_{11}CH$. A portion was evaporated to obtain a viscous clear liquid which was a concentrated solution of $HB_{11}H_{11}CH$.

EXAMPLE 6

Preparation of $HB_9H_9CH$

An aqueous solution of $CsB_9H_9CH$ was passed through an ion exchange column which contained a strongly acidic ion exchange resin. The effluent solution was acidic. A portion was evaporated at room temperature to leave a viscous clear liquid which was a concentrated solution of $HB_9H_9CH$. The presence of the $B_9H_9CH^-$ anion was confirmed by treating another portion of the acidic solution with tetramethylammonium chloride to precipitate $(CH_3)_4N[B_9H_9CH]$, which was identified by its infrared absorption spectrum.

EXAMPLE 7

Preparation of $NH_4[B_9H_9CH]$

Excess ammonium hydroxide was added to an aqueous solution of $HB_9H_9CH$. Evaporation of the solution left crystalline $NH_4[B_9H_9CH]$, the identity of which was confirmed by its infrared absorption spectrum.

EXAMPLE 8

Preparation of $(CH_3)_3S[B_9H_9CH]$

An aqueous solution of $NaB_9H_9CH$, prepared essentially by the method of Example 2–A, was mixed with an aqueous solution of trimethylsulfonium iodide.

$$(CH_3)_3SB_9H_9CH$$

precipitated immediately as a crystalline solid, and was separated by filtration, washed with water, and dried.

The novel salts of this invention can undergo a wide variety of reactions in which the hydrogen bonded to the carbon atom is replaced. For example, salts of $B_nH_nCH^-$, such as the $Cs^+$ or $(CH_3)_3NH^+$ salts, react with hydrocarbyl alkali-metal compounds such as n-butyllithium or phenyllithium, or with Grignard reagents, to give $B_nH_nC$-metallated derivatives. These compounds can then be treated with a variety of reagents to produce compounds having other substituents on the carbon atom.

For example, with carbon dioxide the anion $$B_nH_nCCOOH^-$$

is obtained from which carboxylic acid derivatives such as esters, acyl halides and the like can be obtained. In addition, with trialkylhalosilanes such as trimethylchlorosilane, the anion $B_nH_nCSi(alkyl)_3^-$ is prepared. Cyano groups can be attached to prepare $B_nH_nCCN^-$ by reaction with ClCN, and allyl groups can be substituted to obtain $B_nH_nCCH_2-CH=CH_2^-$, by reaction with allyl halides.

In addition, hydrogens bonded to boron can be replaced. For example, the $B_nH_nCH^-$ anion is reacted with a halogen such as iodine, bromine or chlorine to obtain halogenated derivatives such as $B_9H_8ICH^-$, $B_9H_6Br_3CH^-$, $B_9Cl_9CH^-$, and the like.

The novel acids of this invention are useful as rust removers. For example, a rusted common nail was partially immersed in an aqueous solution of $HB_{11}H_{11}CH$ and another in $HB_9H_9CH$. The solutions were boiled for about one minute; the nails removed and rinsed with water. They were then wiped with a damp paper towel. The rust was readily removed from the treated portion of the nails but adhered to the untreated portions. All of the compounds of the invention are useful in preparing electrical resistors. For example, a piece of cotton string, when soaked with an aqueous solution of a compound of the invention and then dried, burns to a residual ash which had the shape of the string. This had an electrical resistance of 10,000 ohms/cm. Burning an untreated string left no useful shaped ash.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula $$M[B_nH_nCH]$$

wherein $n$ is a whole number selected from 9 and 11, $[B_nH_nCH]$ is an anion of valence $-1$, and M is a cation selected from the class consisting of hydrogen, an alkali metal, one equivalent of an alkaline-earth metal, ammonium, $RNH_3^+$, $RR'NH_2^+$, $RR'_2NH^+$, $RR'_3N^+$ and $R_3S^+$ wherein R is alkyl, cycloalkyl, aryl, alkaryl or aralkyl each having up to 18 carbon atoms and R' is alkyl, cycloalkyl or aralkyl each having up to 18 carbon atoms bonded to N through an aliphatic carbon atom.

2. The compound of claim 1 wherein M is hydrogen.
3. The compound of claim 1 wherein M is ammonium.
4. The compound of claim 1 wherein M is cesium.
5. The compound of claim 1 having the formula $Cs[B_9H_9CH]$.
6. The compound of claim 1 wherein M is tri(lower alkyl)ammonium.
7. The compound of claim 1 wherein M is tetra(lower alkyl)ammonium.
8. Process for preparing compounds of the formula $M''[B_{11}H_{11}CH]$ wherein $M''$ is selected from an alkali metal, one equivalent of an alkaline-earth metal, $RR'_3N^+$ or $R_3S^+$ wherein R is alkyl, cycloalkyl, aryl, alkaryl or aralkyl each having up to 18 carbon atoms, and R' is alkyl, cycloalkyl or aralkyl of 1 to 18 carbon atoms bonded to N through an aliphatic carbon atom; which comprises reacting a compound of the formula $$M'''[B_{10}H_{12}CH]$$

with a compound of the formula $R''R'''R'^vN \cdot BH_3$ wherein $R''$, $R'''$ and $R'^v$ are each an alkyl, cycloalkyl or aralkyl of 1 to 18 carbon atoms; in an inert atmosphere at a temperature of between 100 and 300° C.

9. Process for preparing compounds of the formula $M'''B_9H_9CH$ wherein $M'''$ is a cation selected from sodium, lithium or potassium, which comprises reacting the compound $B_9H_{11}CNR^v_3$ wherein $R^v$ is of up to 18 carbon atoms and is selected from alkyl, cycloalkyl, or aralkyl, bonded to the nitrogen through carbon bearing at least one hydrogen; with a metal selected from sodium, lithium or potassium, in the presence of an ether selected from tetrahydrofuran, diethyl ether, dibutyl ether, dioctyl ether, 1,4-dioxane, diethylene glycol diethyl ether, and 1,2-dimethoxyethane, at a temperature of between about 35–150° C.

10. Process for preparing compounds of the formula $$M'[B_nH_nCH]$$

wherein $M'$ is an alkali metal and $n$ is a cardinal number selected from 9 or 11, which comprises heating between about 200° C. and 500° C., a compound of the formula $$M'[B_{10}H_{12}CH]$$

References Cited

UNITED STATES PATENTS 3,050,361    8/1962    Muetterties      200—606.5 XR
3,376,343    4/1968    Knoth             260—567.6

FLOYD D. HIGEL, Primary Examiner

U.S. Cl. X.R.

29—81, 155.62; 252—500, 518; 260—247, 293, 327, 563, 577, 583, 606.5